Figure 1:
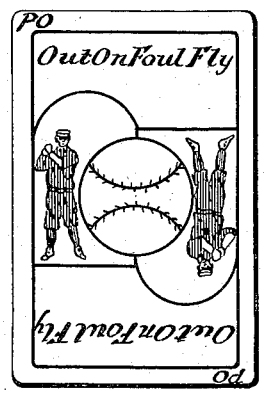
Figure 2:
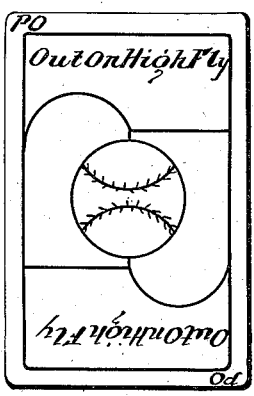
Figure 3:
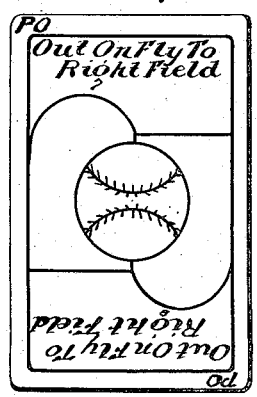
Figure 4:
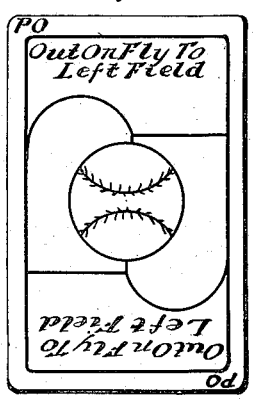
Figure 5:
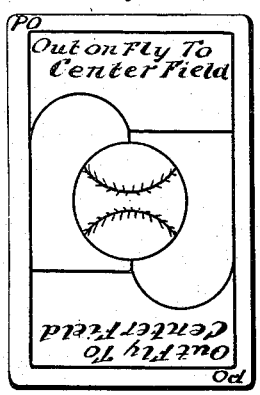
Figure 6:
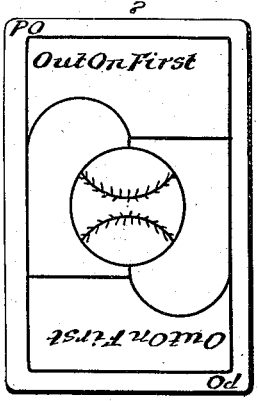
Figure 7:
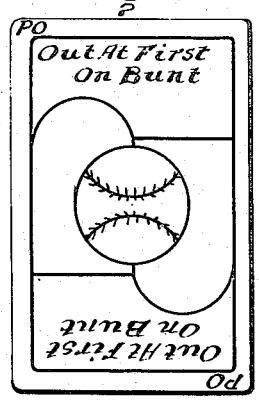
Figure 8:
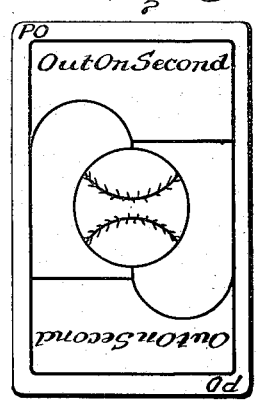
Figure 9:
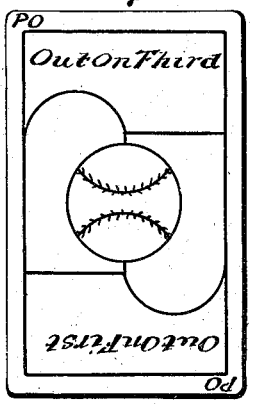
Figure 10:
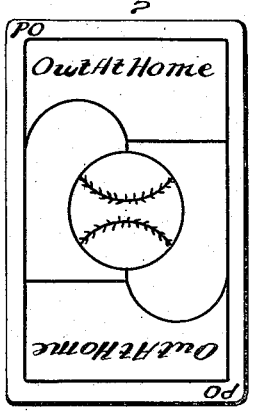
Figure 11:
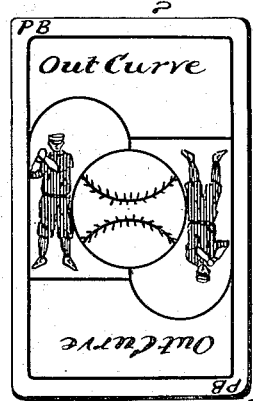
Figure 12:
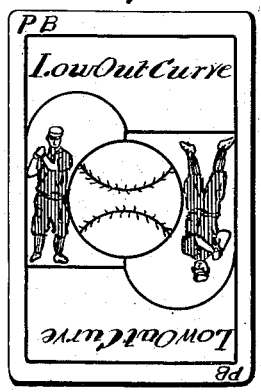
Figure 13:
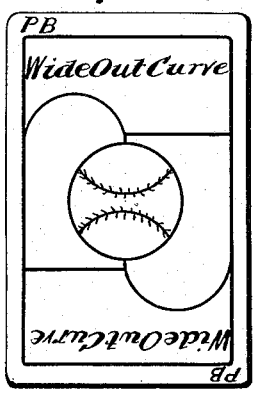
Figure 14:
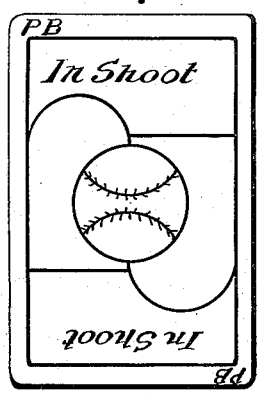
Figure 15:
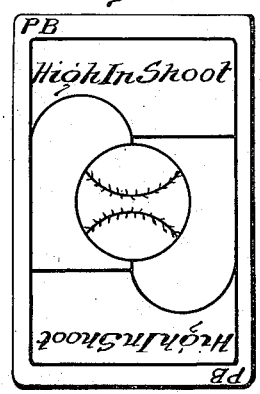
Figure 16:
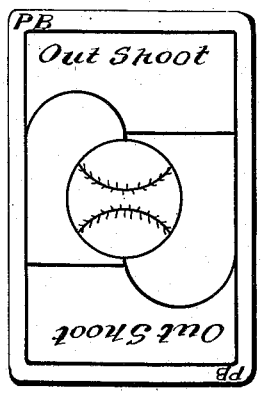
Figure 17:
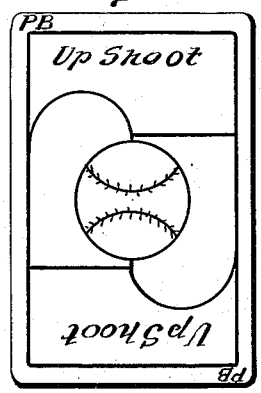
Figure 18:
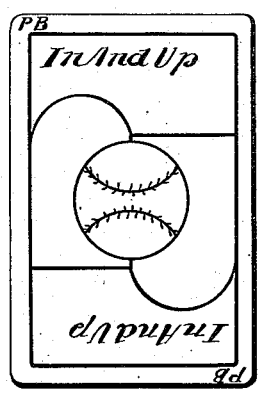
Figure 19:
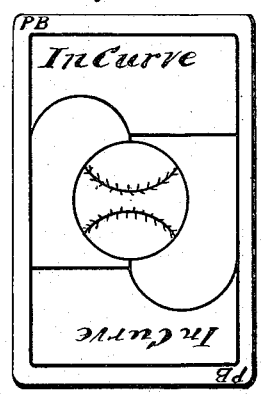
Figure 20:
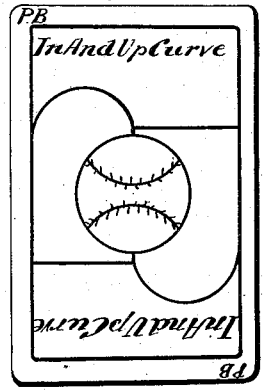
Figure 21:
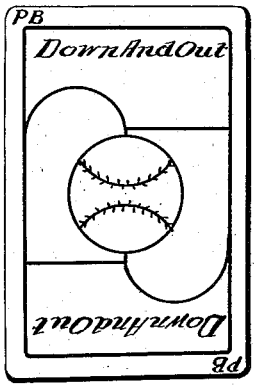
Figure 22:
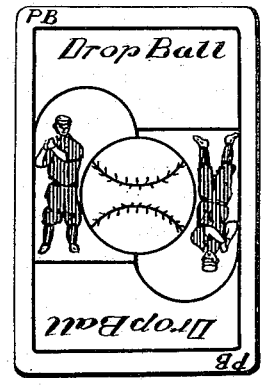
Figure 34:
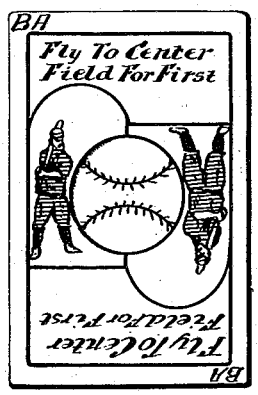
Figure 35:
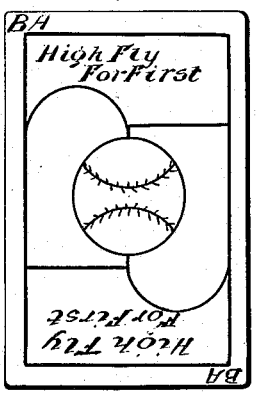
Figure 36:
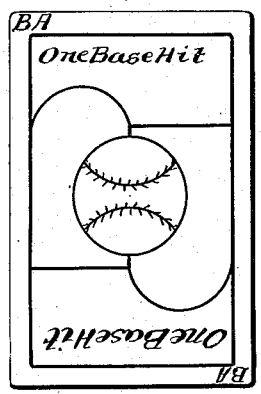
Figure 37:
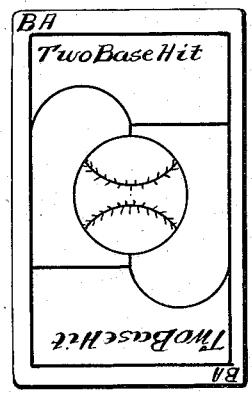
Figure 38:
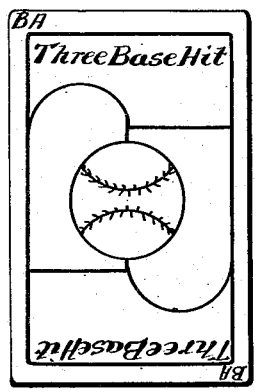
Figure 39:
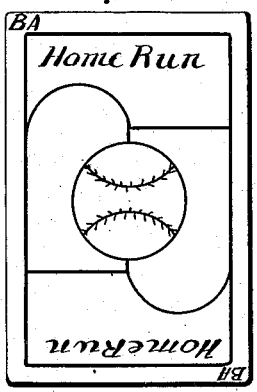
Figure 40:
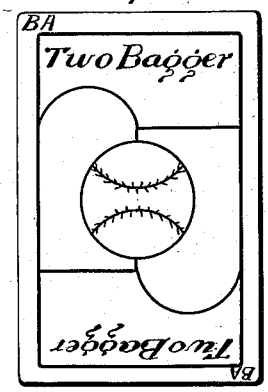
Figure 41:
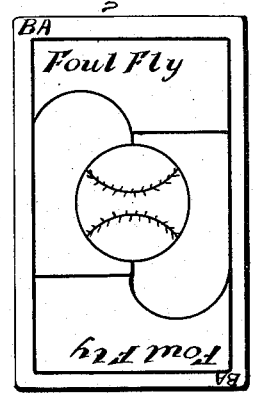
Figure 42:
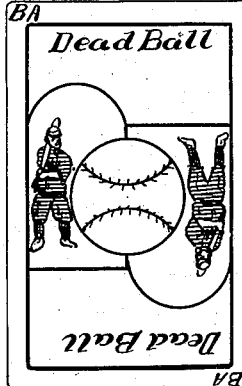

R. L. CATES.
GAME APPARATUS.
APPLICATION FILED SEPT. 21, 1906.

933,289.

Patented Sept. 7, 1909.
4 SHEETS—SHEET 1.

Inventor
R. L. Cates

Witnesses

R. L. CATES.
GAME APPARATUS.
APPLICATION FILED SEPT. 21, 1906.

933,289.

Patented Sept. 7, 1909.
4 SHEETS—SHEET 2.

Witnesses

Inventor
R. L. Cates
By
Attorneys

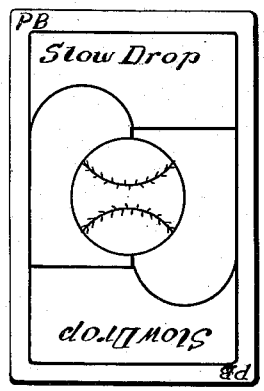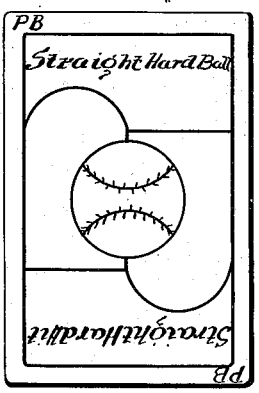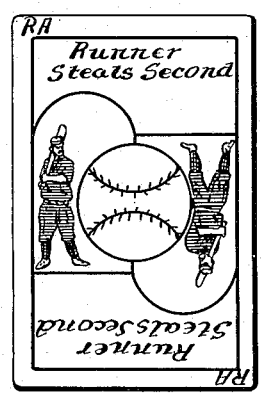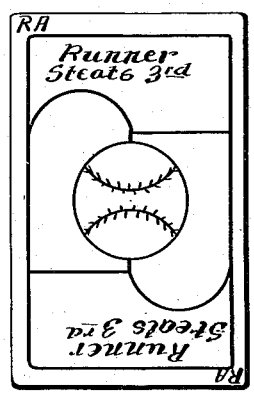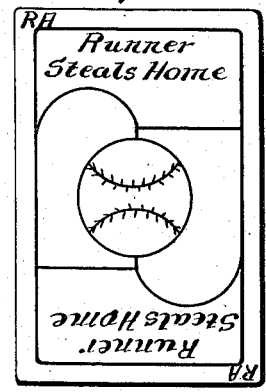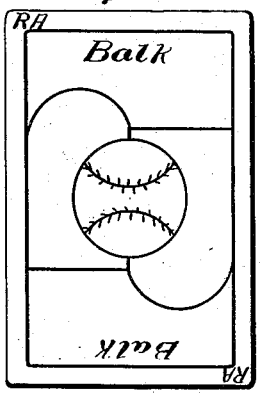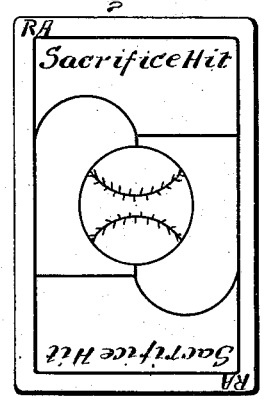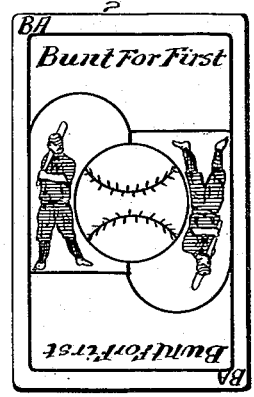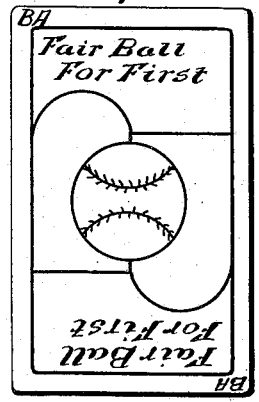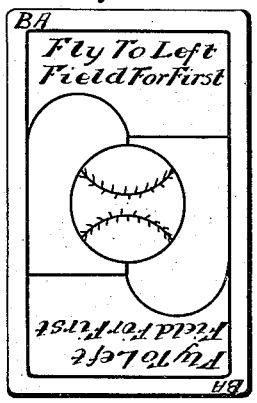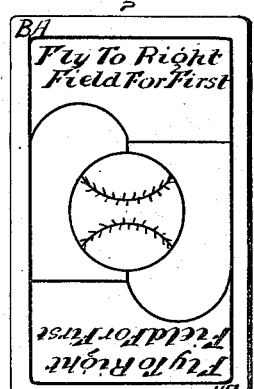

R. L. CATES.
GAME APPARATUS.
APPLICATION FILED SEPT. 21, 1906.

933,289.

Patented Sept. 7, 1909.
4 SHEETS—SHEET 4.

Inventor
R. L. Cates
By R.a.R.Lacy.
Attorneys

Witnesses

UNITED STATES PATENT OFFICE.

ROBERT L. CATES, OF KINGMAN, KANSAS.

GAME APPARATUS.

933,289.  Specification of Letters Patent.  Patented Sept. 7, 1909.

Application filed September 21, 1906. Serial No. 335,663.

*To all whom it may concern:*

Be it known that I, ROBERT L. CATES, citizen of the United States, residing at Kingman, in the county of Kingman and State of Kansas, have invented certain new and useful Improvements in Game Apparatus, of which the following is a specification.

This invention relates to game apparatus of the type embodying a pack of cards, the purpose being to devise a game which will enable devotees of the popular game of base ball to play the same in the parlor or other sheltered place upon paper and by means of cards, the game presenting all, or nearly so, the phases of the game as played in the field, both with respect to pitching, batting, running, scoring, innings, etc.

The game apparatus comprises an umpire which is the master card, and a set of cards favoring the batters and a set favoring the fielders, the batters' cards being subdivided into two sets, one set designating batsman's advance and the other set runner's advance. The fielders' cards are likewise provided in two sets, one set designating "pitch ball" and the other set "put out."

For a full understanding of the invention and the merits thereof and also to acquire a knowledge of the details of construction of the means for effecting the result, reference is to be had in the following description and accompanying drawings.

While the invention may be adapted to different forms and conditions by changes in the structure and minor details without departing from the spirit or essential features thereof, still the preferred embodiment is shown in the accompanying drawings, in which:

The figures numbered 1 to 10 inclusive represent one set of the "fielders' cards", being "put out". The figures numbered 11 to 24 inclusive indicate the other set of the "fielders' cards," being "pitch ball". The figures numbered 25 to 29 inclusive designate the five cards of the set favoring the batters and known as the "runners' advance". The figures numbered 30 to 42 inclusive represent the set favoring the batters and designated as the "batters' advance". The figure numbered 43 is the "umpire" or master card.

Corresponding and like parts are referred to in the following description and indicated in all the views of the drawings by the same reference characters.

Figure 43:

The drawings illustrate forty-three cards only, whereas the pack contains fifty-nine cards, it being understood that certain of the cards are duplicated, as hereinafter more particularly set forth. In general design, each of the cards, with the exception of the umpire or master card present a like appearance, the same containing the representation of a base ball upon the center overlapping adjacent panels having an opposite arrangement and each bearing the representation of a base ball player in different attitudes. The twenty cards accorded to the batters, bear the representation of a base ball player holding a club in position to strike a pitched ball. The thirty-eight cards favoring the fielders bear the representation of a base ball player in an attitude of pitching a ball. The two figures of the ball players upon each card appear at opposite sides of the base ball and in opposite position so that no matter which end of the card is uppermost, one of the figures appears in vertical position. The matter designating the value of each card is drawn across the end, like matter being provided at opposite ends so as to obviate the necessity of turning the cards in the hand. The indicating matter representing those at the bat and the fielders appears at opposite corners of the cards, the pitch ball cards having the letters " P B " at opposite corners; the " put out " cards, the letters " P O "; the batsman's advance, the letters " B A "; and the runner's advance, the letters " R A ". There is one card only representing umpire, the same being shown in Fig. 43 and bearing the representation of the bust of a man with a rounded head, suggestive of a base ball. This card enables the holder to control the previous play or ruling, notwithstanding the nature of the play, and thereby enabling the person playing the umpire card to make a favorable ruling to his or her advantage. There are twenty cards in favor of the batters, fifteen of said cards corresponding to the batters and five to the runners. The set of cards in favor of the batters have fifteen designated as batsman's advance and are designated by the index letters " B A " and five of the twenty represent the runner's advance and are indicated by the letters " R A " at opposite corners. As shown in Figs. 30 to 42, the fifteen batsman's advance cards have the following values and contain two cards; " bunt for first ", two; " foul fly ", two, and one each of the following: " fair ball for first"; "fly to left field for first"; "fly to right field for first"; "fly to center field for first"; "high fly for first"; "one base hit"; "two base hit"; "three base hit"; "home run"; "two bagger"; and "dead ball". The five cards representing the runner's advance contain the following values printed across opposite ends thereof, namely; "steal second"; "steal third"; "steal home"; "balk"; and, "sacrifice hit". The thirty-eight cards favoring the fielders are divided so that twenty-two of the cards represent "pitch ball" and sixteen "put out". The "pitch ball" cards, twenty-two in number, designated by the letters "P B" are subdivided as follows: "out-curve", two; "low out curve", one; "wide out curve", one; "in shoot", three; "high in shoot", one; "out shoot", three; "up shoot", three; "in and up", one; "in curve", one; "in and up curve", one; "drop ball", two; "slow ball", one; "hard ball", one. The sixteen "put out" cards indicated by the letters "P O" are subdivided as follows: "foul fly", one; "high fly", one; "right field", one; "left field", one; "center field", one; "first", two; "first on bunt", two; "out on second", three; "out on third", two; "out home", two.

In order that the game may be easily understood, the following explanation of plays is given. We will designate the dealer as No. 1. The player on his left No. 2. The next one No. 3 and the last one No. 4. No. 1 and No. 3 are partners and are at the bat while No. 2 and No. 4 are partners and are in the box and field. After the deal, each has five cards and No. 2 must commence the game, and we will say he drew a card which says "Out curve" which he leads, face up on the table and remarks "I will give you an out curve" and then draws one card from the top of the deck which should be placed face down on the table so as to keep hand at just five cards. It is now No. 3's play and it is assumed that he has drawn a card which says "Bunt for first" which he plays and calls out "I will bunt it for first", and then draws one card from top of the deck to keep his hand at five cards, and a man is then put on first base as a runner. It is now No. 4's play and assuming he holds a card which says "Out on bunt to first" which he plays and calls out "Out on bunt to first", then he draws card the same as Nos. 2 and 3. This puts one man out. No. 4 must now throw a pitch ball card for No. 1 and assuming he has a card which says "High in shoot" which he plays and says "I will give you a 'high in shoot'". Now No. 1 must play and we will say he has a card which says "Home run" which he plays, saying "I will hit it a 'home run'". No. 2 must now play and should he hold a card which says "Out at home" which he plays, calling "Out at home" which makes two "outs". No. 2 must now play a pitch ball card to No. 3, and we will say he has a card which says "Slow drop" which he plays and calls out, "Slow drop". No. 3 now has to play and assuming that he has a card which says "Three base hit" which he plays, calling out "Three base hit". No. 4 now has a play and we will say he holds a card which says "Out at third", which he plays, calling "Out at third" which retires the side at bat with no score. Now having put the side out, No. 2 becomes the dealer for the next inning which puts him and his partner, No. 4 at the bat and under this inning we will assume a different condition to exist by the deal. No. 2 having dealt, No. 3 must commence the game and we will say that in the deal he does not get a pitch ball card; this makes him unable to pitch a ball to No. 4, so he must discard one card from his hand and draw one from the top of the deck, saying at the same time to No. 4: "I will give you a ball," but does not play a card on the table except the discard which he plays face down on the table. No. 4 must now play, but if he does not hold a card by which he can bat the supposed thrown ball, he can say "I pass it", neither discarding nor playing. It is then marked "one ball" against the pitcher side, but No. 4 can, if he desires, discard one card and draw one from the deck, remarking as he does so: "I will strike at it", in which case it is not counted "one ball" against Nos. 1 and 3, but is called "one strike" against Nos. 2 and 4. In this manner three strikes may be made, putting one out, or four balls can be thrown, giving the batter his base. Now we will go back to the beginning of this inning and suppose that No. 3 has a "pitch ball" card that he played to No. 4 and No. 4 has no "batter's advance" card, he must discard one card from his hand and draw one from the deck, remarking as he plays: "I will strike at it", but plays no card on the table. This counts "one strike" against the batters. No. 1 must now play a "pitch ball" card to No. 2, if he has one or give him a ball by discarding and drawing as described at the commencement of this inning. The "umpire" card can be played by either side, and can revoke any play made by the preceding player. He is the "joker" of the deck. The "balk" card can be played only when a man is on the base and playing it advances the runner one base. The "dead ball" card advances the batter to first base. A pitcher cannot play a "P O" card after having played a "P B" card.

In order to keep correct score, the figure of a diamond may be marked off upon a paper, board or other surface and buttons, checkers or other pieces moved thereon to represent runners on bases, each piece being moved according to the play designated by the cards.

Having thus described the invention, what is claimed as new is:

1. Game apparatus comprising two sets of cards, one set bearing data to serve as leading cards, the other set bearing data to serve as responsive cards, each of the two sets of cards being subdivided into two series differently designated, and an umpire card to control a previous play irrespective of the otherwise designating matter.

2. Card game apparatus for playing base ball, the same comprising five sets of cards, each set consisting of a different number of cards and bearing different data, two of the said sets representing fielders and another two sets representing batters, and a fifth being the umpire to control a previous play, the fielders' set bearing data to indicate the character of ball delivered and the result of such ball when delivered, and the batters' set bearing data to indicate the nature and the result of the ball delivered, whether in favor of the batter or the runner.

In testimony whereof I affix my signature in presence of two witnesses.

ROBERT L. CATES. [L. S.]

Witnesses:
R. S. CATES,
F. R. SPURRIER.